Figure 1:
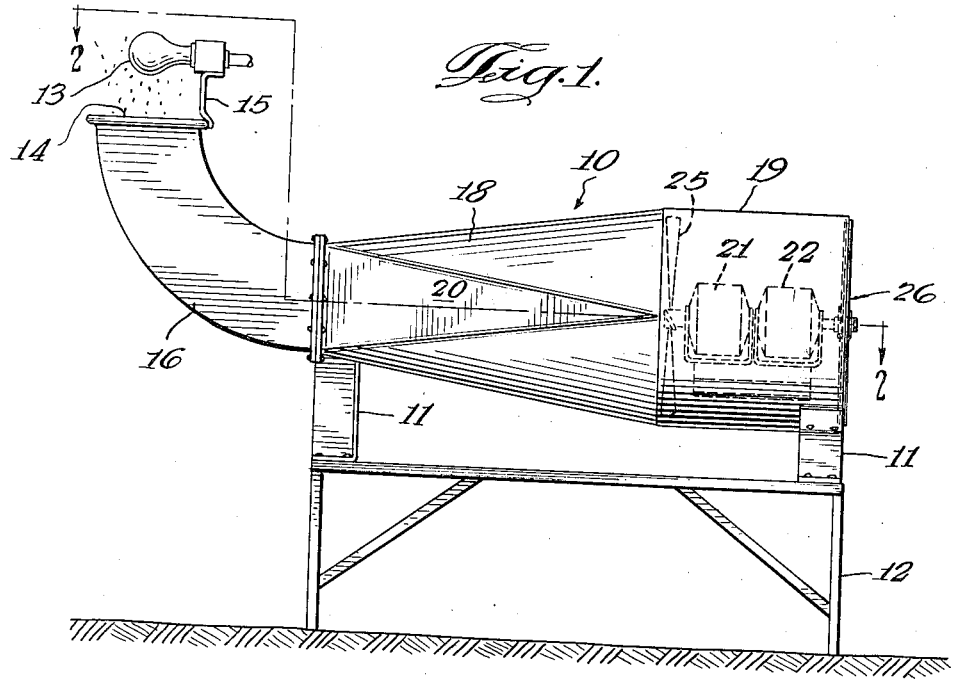

Jan. 22, 1957 W. A. POHLMAN 2,778,150
INSECT EXTERMINATOR
Filed March 21, 1955 3 Sheets-Sheet 1

Inventor
William A. Pohlman
By Schroeder, Hofgren, Brady & Wegner
Attorneys

Jan. 22, 1957    W. A. POHLMAN    2,778,150
INSECT EXTERMINATOR
Filed March 21, 1955    3 Sheets-Sheet 2
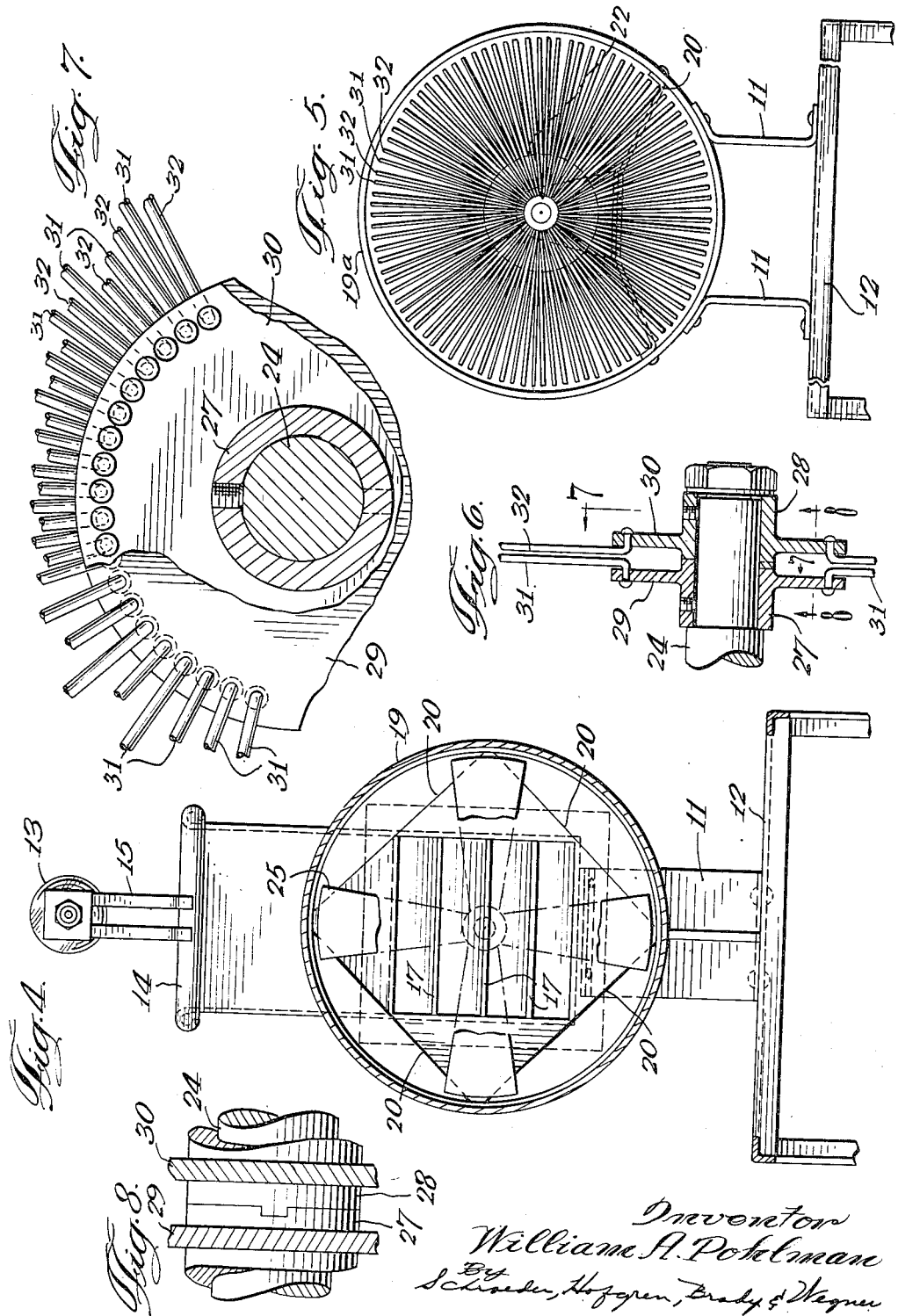
Inventor
William A. Pohlman
By Schroeder, Hofgren, Brady & Wegner
Attorneys

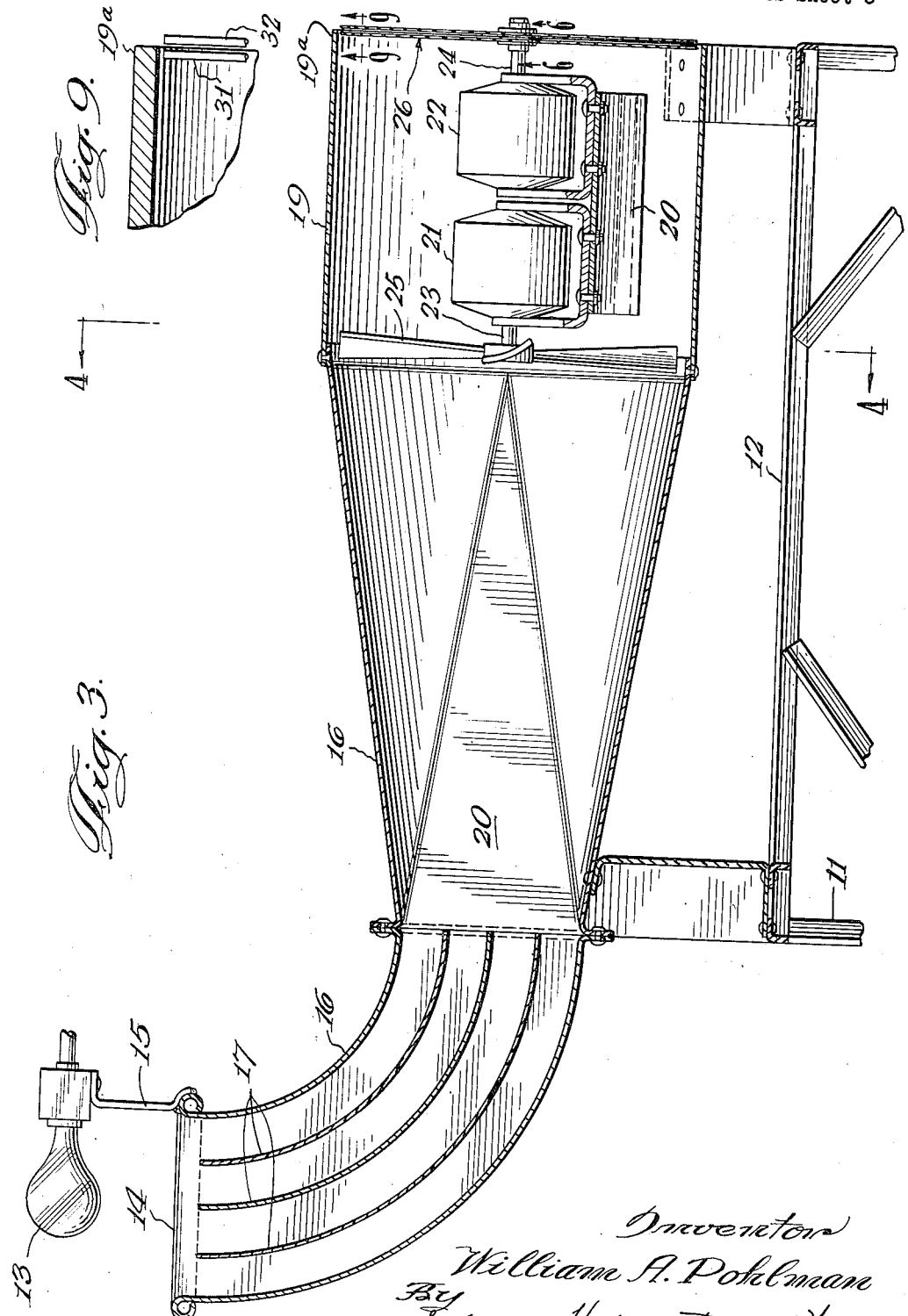

United States Patent Office 2,778,150
Patented Jan. 22, 1957

2,778,150

INSECT EXTERMINATOR

William A. Pohlman, Chicago, Ill., assignor to Gardner Manufacturing Company, Horicon, Wis.

Application March 21, 1955, Serial No. 495,520

3 Claims. (Cl. 43—139)

This invention relates to an insect exterminating device, and in particular it relates to a unit of large size which may be used outdoors for the destruction of crop-destroying pests. This application is a continuation-in-part of my copending application Serial No. 433,328, filed June 1, 1954.

Most crop-destroying pests stay in the growing crop, close to the ground, and do not come within reach of an insect exterminating device of the conventional sort.

Furthermore, in areas where there are enormously heavy concentrations of insect pests the conventional exterminating devices which use electrically charged grids in conjunction with a light or other insect attracting means become choked with dead insects so rapidly that they must be frequently cleaned in order to maintain their efficiency.

In accordance with the present invention, an insect attracting means such as an electric light is positioned above the mouth of an insect receiving and guiding conduit the inner end of which is a distributor portion which opens into a blower housing in which is a large capacity suction fan. The distributor portion is shaped and dimensioned to minimize turbulence in the air stream approaching the fan.

Mounted coaxially with the fan and driven by a separate motor at a different speed is a rotating insect chopper which has two rows of radial spokes which are offset with respect to one another and have unsupported outer ends. The insect chopper does not become choked because centrifugal force makes it substantially self-cleaning; and the spokes are effectively in the plane of the discharge end of the conduit so that insects flung off the ends of the spokes go out the end of the conduit instead of piling up on its wall.

The spokes are slender enough to develop substantial vibration and whip so that they weave across each other and reduce the possibility of an insect being blown between them. Rotating the chopper at a different speed from the fan also helps to prevent insects from being blown between the blades. Two motors are less expensive than a single motor and gear train because a one H. P. motor is adequate for the fan and one-half H. P. for the chopper, while a five H. P. motor would be needed to drive the fan direct and the chopper through gears.

With an 18 inch four-blade fan operating at 1750 R. P. M. in a 20 inch housing having a one foot square conduit opening the air flow through the unit is about 15,000 cubic feet a minute with an air flow toward the conduit inlet sufficiently strong to draw insects into the conduit. A four-blade fan at 3,400 R. P. M. increases the air flow about 60%.

Figure 2:
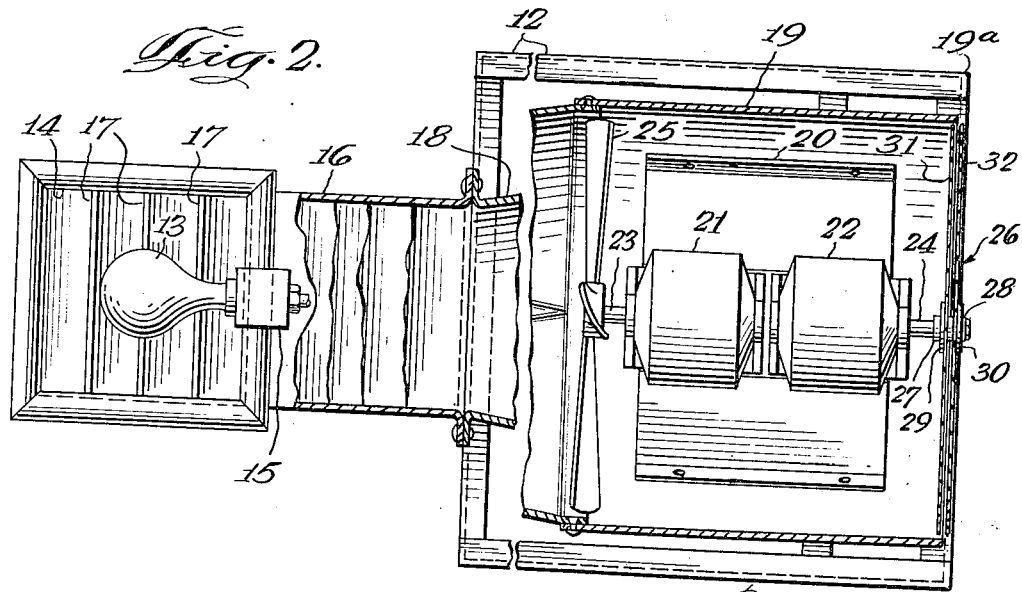

The invention is illustrated in a preferred embodiment in the accompanying drawings in which:

Fig. 1 is a side elevational view of the device;
Fig. 2 is a fragmentary sectional view on an enlarged scale taken an indicated along the line 2—2 of Fig. 1;
Fig. 3 is a fragmentary, vertical, central, sectional view on the same scale as Fig. 2;
Fig. 4 is a section taken as indicated along the line 4—4 of Fig. 3;
Fig. 5 is a fragmentary rear elevational view;
Fig. 6 is an enlarged, fragmentary section taken as indicated along the line 6—6 of Fig. 3;
Fig. 7 is a fragmentary section taken as indicated along the line 7—7 of Fig. 6;
Fig. 8 is an enlarged fragmentary section taken as indicated along the line 8—8 of Fig. 6; and
Fig. 9 is an enlarged fragmentary section taken as indicated along the line 9—9 of Fig. 3.

Referring to the drawings in greater detail, and referring first to Fig. 1, the present invention includes an insect receiving and conducting conduit, indicated generally at 10, having supports 11 by means of which it is mounted upon a table 12. An insect attracting means such as an electric light 13 is mounted above the horizontal inlet end 14 of the conduit 10 on a bracket 15.

Referring to Figs. 2 and 3, the inlet 14 of the conduit 10 is horizontally disposed beneath the light source 13, and the conduit has an arcuate receiving portion 16 which is square in cross section and which is provided with parallel air flow guide plates 17. The receiving portion of the conduit 10 communicates directly with a horizontally extending conduit distributor portion 18 which increases in size toward its connection with a blower housing 19, the rear of which forms the discharge end 19a of the conduit. Since the distributor portion 18 connects a square with a circle, it has flat faces 20 which are in the form of long triangles having their bases adjacent the receiving portion 16 and their apexes at the margin of the blower housing 19.

In the blower housing 19 is a bracket 21a for an electric fan motor 21 and a chopper motor 22 which are disposed in tandem and have their respective shafts 23 and 24 extending in opposite directions. On shaft 23 is a four-blade propeller 25 which occupies substantially the entire diameter of the fan housing 19 where it is joined by the distributor portion 18 of the conduit. The propeller 25 is pitched to draw air in through the conduit inlet 14 so as to create a high velocity air blast through the conduit, the air flow preferably being upwards of 1,500 C. F. M.

The shape and size of the distributor portion 18 is important in directing the incoming insect laden air to the propeller 25 with a minimum of turbulence. Specifically, in the preferred embodiment shown the portion 18 is 10 inches wide at its mouth, 20 inches wide at its juncture with the blower housing 10, and 32 inches long. Thus, the ratio of inlet to outlet is 1:2, the ratio of length to inlet is about 3:1 and the ratio of length to outlet about 1.5:1. The shape of the distributor, with a square mouth merging on long inclines into a larger circular outlet, also assists proper flow of air.

The chopper shaft 24 is provided with a chopper, indicated generally at 26, which is best seen in Figs. 6 to 9. The chopper has a pair of interlocking hubs 27 and 28 which have circumferential flanges 29 and 30, respectively; and on the respective flanges are radial spokes 31 and 32 which are free at their outer ends. The spokes 31 and 32 are preferably wire which is heavy enough to be self-supporting without a rim, but which is slender enough to whip and weave so that the spokes may cross and recross one another; and the spokes 32 preferably are opposite the openings between the spokes 31. As best seen in Fig. 9, the ends of the spokes are about ¼ inch from the housing 19 and are effectively coplanar with the discharge end 19a of the conduit, so that bugs or bug particles which are flung off the ends of the spokes 31 and 32 may go outside blower housing 19 instead of piling up on the wall flanking the chopper.

As previously pointed out, the air blast through the conduit and the blower housing employing an 18 inch fan at 1750 R. P. M. produces an air flow through the machine of about 15,000 cubic feet a minute, and the insects may be caught up in the air flow toward the conduit inlet 15 for a considerable radius around the inlet. The air blast passes through the rotating chopper which chops the insects. The centrifugal force of the rotating chopper tends to throw the choppings off the blades, so that they may be carried out of the fan chamber in the air blast. The fan motor 21 is preferably one H. P. while the chopper motor 22 is one-half H. P.; and the latter has a lower normal speed than the former.

The foregoing detailed description is given for clearness of understanding only and no unnecessary limitations are to be understood therefrom, as some modifications will be obvious to those skilled in the art.

I claim:

1. In an insect exterminator: an insect receiving and conducting conduit having an inlet end and a discharge end which opens directly to the atmosphere; a pair of electric motors mounted in tandem in said conduit with their shafts axially positioned therein, said motors having different normal operating speeds; a propeller type fan on one motor shaft which extends entirely across the conduit; and a chopper member on the other motor shaft, said chopper member including a hub and a plurality of radially extending spokes on said hub effectively in the plane of the discharge end of the conduit and extending entirely thereacross, said spokes having unobstructed outer ends so that insect particles may be flung off the spokes by centrifugal force and discharged outside the exterminator.

2. In an insect exterminator: an insect receiving and conducting conduit having an inlet end and a discharge end which opens directly to the atmosphere; a pair of electric motors mounted in tandem in said conduit with their shafts axially positioned therein, said motors having different normal operating speeds; a propeller type fan on one motor shaft which extends entirely across the conduit; and a chopper member on the other motor shaft, said chopper member including a hub and a plurality of radially extending spokes on said hub effectively in the plane of the discharge end of the conduit and extending entirely thereacross, said spokes being unsupported at their outer ends, whereby insect particles may be flung off the spokes by centrifugal force and discharged outside the exterminator.

3. In an insect exterminator: an insect receiving and conducting conduit having an inlet end and a discharge end which opens directly to the atmosphere; means for creating a high speed air blast through said conduit; and rotating chopper means extending across the discharge end of the conduit, said chopper means including a hub and a plurality of radially extending spokes on said hub which are effectively in the plane of the discharge end of the conduit and which are unsupported at their outer ends, whereby insect particles may be flung off the spokes by centrifugal force and discharged outside the exterminator, said hub including two spaced circumferential collars, and the spokes are secured to each collar with a minimum angular displacement between spokes, the spokes on one collar being offset from those on the other collar so that there is substantially no circumferential space between a spoke on one collar and the adjacent spoke on the other collar.

References Cited in the file of this patent

UNITED STATES PATENTS

| | | |
|---|---|---|
| 777,088 | Franklin | Dec. 13, 1904 |
| 1,024,698 | Pinson | Apr. 30, 1912 |
| 1,036,331 | Plumer | Aug. 20, 1912 |
| 1,263,312 | Diserens | Apr. 16, 1918 |
| 1,302,972 | Rea | May 6, 1919 |
| 1,827,727 | Blizard | Oct. 20, 1931 |
| 2,340,944 | Easter | Feb. 8, 1944 |

FOREIGN PATENTS

| | | |
|---|---|---|
| 254,227 | Germany | Nov. 28, 1912 |